Patented Nov. 2, 1937

2,097,516

UNITED STATES PATENT OFFICE 2,097,516

PROCESS FOR PRESERVING OILS AND FATS

Mayne R. Coe, Washington, D. C., dedicated to the free use of the Public in the United States of America No Drawing. Application January 30, 1935, Serial No. 4,097

5 Claims. (Cl. 87—12)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without payment to me of any royalty thereon.

I hereby dedicate the invention herein described to the free use of the Public in the territory of the United States of America, to take effect upon the granting of a patent to me.

My invention relates to the preservation of oils and fats. It is well known that food, feedstuffs and all commodities bearing oils and fats are subject to rancidity whereby they are affected adversely in natural agreeable flavor and quality, and in advanced stages destroying the food or other value of the material or its usefulness.

It is well known that rancidity is due to wavelengths of light occasioned by photochemical action on certain reactive substances in the oils and fats. During exposure of oil-bearing commodities to photochemical action, decomposition takes place due to the presence of air. When an antioxidant is added, oxidation is at a minimum and the oil is retarded in rancidity development, and thus the oil keeps fresh for a longer period.

I have discovered that when catalase is added to, or incorporated with an oil or fat, rancidity development is prevented or delayed over a considerable period of time. This is shown by a determination of the peroxide value, which is a well known test for detecting the progress of the development of rancidity in an oil or fat. The oils and fats to which catalase has been added do not give a peroxide value comparable to the oils or fats untreated.

The catalase may be added in any way best suited for the oil or fat commodity. Experiment shows that it is better to add an oil or fat soluble catalase which has been isolated in as pure a state as possible from its carrier, but catalase added in the form of cheese, liver extract, or plant material has been found effective. The general properties of catalase and the purification of liver catalase and catalase from vegetable substances are disclosed by Zeile in Ergebnisse Enzymforschung, vol. 3, pages 265–288 (1934) and by Zeile and Hellström in Zeits. Phys. Chemie., vol. 192, page 171. The amount of catalase to be added should be in sufficient quantity to exhibit preservative properties. This amount, of course, may vary according to the bulk of the commodity to be treated and the potency of the catalase utilized.

In an experiment using purified catalase obtained from liver 1 cc. of the purified catalase to 25 cc. of refined corn oil was found to prevent rancidity far beyond the induction period of untreated refined corn oil. The period of protection, of course, is controlled by the percentage and potency of the catalase used.

When cheese is used to supply catalase, I have found that one-half gram of ripened cheese to 25 cc. of oil, such as cottonseed or corn oil, lard, etc. is effective. By the term "ripened cheese" is meant cheese which has undergone fermentation or aging under controlled conditions in order to attain properties and characteristics of that type. The catalase should preferably be in an oil soluble form. The greater the activity of the catalase added, the longer rancidity will be prevented but there should not be added so great an amount of catalase and its carrier as to affect the flavor of the commodity where the retention of such flavor is desired.

The theory of how catalase acts as an inhibitor to the development of rancidity is shown by the following indicated reactions:

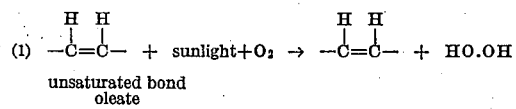

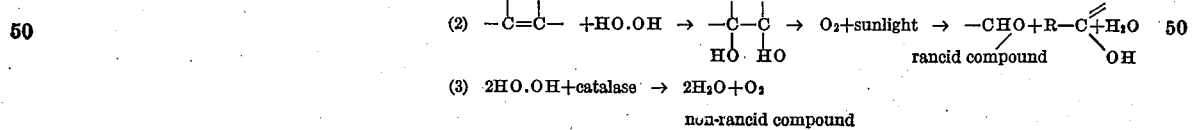

non-rancid compound

Having fully disclosed my discovery, I claim:

1. The process of preventing rancidity in commodities containing oils and fats which comprises incorporating substantially pure catalase in such oil-bearing commodities.

2. An article of manufacture which comprises an oil or fat containing commodity to which has been added substantially pure catalase.

3. The process of preventing rancidity in commodities containing oils or fats which comprises incorporating ripened cheese in such oil-bearing commodities.

4. The process of preventing rancidity in commodities containing oils or fats which comprises incorporating catalase, isolated from its carrier, in such oil or fat bearing commodities.

5. An article of manufacture which comprises an oil or fat containing commodity to which has been added catalase isolated from its carrier.

MAYNE R. COE.